United States Patent
Horie et al.

(10) Patent No.: US 6,564,643 B1
(45) Date of Patent: May 20, 2003

(54) CAPACITIVE PRESSURE SENSOR

(75) Inventors: Junichi Horie, Hitachinaka (JP); Atsushi Miyazaki, Mito (JP); Satoshi Shimada, Hitachi (JP); Akihiko Saitou, Kawasaki (JP); Yasuo Onose, Tokai-mura (JP); Norio Ichikawa, Mito (JP); Keiji Hanzawa, Mito (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 09/807,325

(22) PCT Filed: Sep. 20, 1999

(86) PCT No.: PCT/JP99/05116

§ 371 (c)(1),
(2), (4) Date: Apr. 20, 2001

(87) PCT Pub. No.: WO00/22397

PCT Pub. Date: Apr. 20, 2000

(30) Foreign Application Priority Data

Oct. 12, 1998 (JP) ............................................ 10-289061

(51) Int. Cl.[7] .................................................. G01L 9/12
(52) U.S. Cl. ........................ 73/724; 73/718; 361/283.4
(58) Field of Search ...... 73/724, 718; 361/283.1–283.4

(56) References Cited

U.S. PATENT DOCUMENTS 3,787,764 A    1/1974   Andeed et al. ............ 324/61 P
4,625,560 A   12/1986   Sanders ........................ 73/718
4,998,179 A    3/1991   Grantham et al. ........... 361/283
5,369,544 A   11/1994   Mastrangelo ............. 361/283.4
5,561,247 A   10/1996   Mutoh et al. ................. 73/724
5,992,240 A *  11/1999   Tsuruoka et al. ............. 73/718

FOREIGN PATENT DOCUMENTS

JP    3-81635      4/1991
JP    6-288852    10/1994
JP    7-7162      1/1995

* cited by examiner

*Primary Examiner*—Hezron Williams
*Assistant Examiner*—Jermaine Jenkins
(74) *Attorney, Agent, or Firm*—Crowell & Moring LLP

(57) ABSTRACT

A high-accuracy high-stability capacitor type pressure sensor which eliminates a parasitic capacitance between a reference capacitor and a semiconductor substrate. A capacitor type pressure sensor comprising, on a semiconductor substrate 10, an active capacitor 100 whose capacitance varies as the surrounding pressure varies, a reference capacitor 200 whose capacitance will not vary substantially as the surrounding pressure varies, and a circuit which is electrically connected to both said active and reference capacitors 100 and 200, detects the difference or ratio thereof, and uses the potential of a semiconductor substrate, wherein an electrode 30*a* of said reference capacitor is formed on the semiconductor substrate 10 with a dielectric 20 therebetween.

5 Claims, 5 Drawing Sheets

FIG. 8

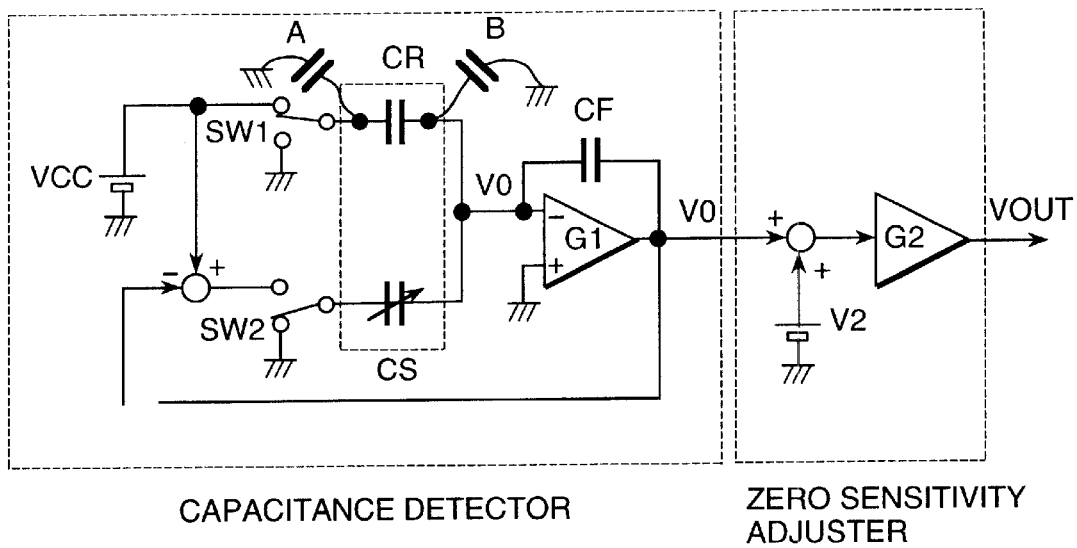

CAPACITANCE DETECTOR    ZERO SENSITIVITY ADJUSTER

10 ··· SEMICONDUCTOR SUBSTRATE
20 ··· OXIDE DIELECTRIC
30 ··· CONDUCTOR
30a ··· LOWER ELECTRODE
30b ··· STATIONARY ELECTRODE ( ACTIVE CAPACITANCE )
30c ··· WIRING
30d ··· STATIONARY ELECTRODE ( REFERENCE CAPACITANCE )
40 ··· BARRIER DIELECTRIC LAYER
50 ··· SEALING DIELECTRIC
60 ··· METALLIC CONDUCTOR
60a ··· UPPER ELECTRODE
60b ··· WIRING SECTION
70 ··· CONTACT STRUCTURE
100 ··· ACTIVE CAPACITANCE
110 ··· SPACE
120,220 ··· DIAPHRAGM STRUCTURE
120a,220a ··· DIAPHRAGM ELECTRODE
120b ··· STATIIONARY SCAFFOLD
130 ··· DIAPHRAGM ELECTRODE JOINT
200 ··· REFERENCE CAPACITANCE
201 ··· REFERENCE CAPACITANCE DIELECTRIC
202 ··· OXIDE LAYER
203 ··· PASSIVATION LAYER
210 ··· SPACE
220b ··· STATIONARY SCAFFOLD
330 ··· DETECTING CIRCUIT
400 ··· PRESSRE DETECTING IC

CAPACITIVE PRESSURE SENSOR

FIELD OF THE INVENTION

The present invention relates to a pressure sensor for detecting a pressure of fluid, particularly to a pressure sensor used to control a car engine and the like which is made using a semiconductor fine processing technology.

PRIOR ART

For example, Japanese Non-Examined Patent Publication No.7-7162 (1995) discloses a conventional pressure sensor.

The conventional pressure sensor is a capacitor type pressure sensor formed on a semiconductor substrate, comprising a reference capacitor which remains constant independently of a surrounding pressure and a sensing capacitance which varies as the surrounding pressure varies. Each capacitor consists of a first electrode which is a diffusion layer formed directly on a semiconductor substrate and a second electrode of a flexible diaphragm which is formed opposite to said first electrode with a cavity between said first and second electrodes and contains a conductive area made of single-crystal silicone. The cavity is sealed to keep a preset pressure. Both reference and sensing capacities use a diffusion layer formed on the semiconductor substrate as the first electrode. The pressure sensor disclosed by Japanese Non-Examined Patent Publication No.7-7162 (1995) is characterized in that the flexible diaphragm moves as the surrounding pressure varies and thus the capacitance between the first and second electrodes varies.

DISCLOSURE OF THE INVENTION

For higher accuracy, a well-known conventional capacitor type pressure sensor employs a technology comprising the steps of using a reference electrode which has a capacitance almost equal to that of an active capacitor and will not vary substantially as means to cancel a characteristic change of the active capacitor due to external disturbing factors such as noises and uneven processing which is not related to the pressure change and calculating a capacitance difference between the reference capacitor and the active capacitor or a ratio thereof by a detecting circuit.

For higher accuracy of a capacitor type pressure sensor comprising a reference capacitor, an active capacitor and a detecting circuit on a semiconductor substrate, there may arise a problem that an unwanted parasitic capacitance (or a junction capacitance) which may vary due to the concentration of impurities in the substrate or a potential difference between the substrate and the reference capacitor electrode generates between the reference capacitor electrode and the semiconductor substrate. Therefore, when the semiconductor substrate is grounded or connected to a detecting circuit which is used as a power supply, the parasitic capacitance between the electrode and the semiconductor substrate varies greatly relative to a preset capacitance formed between reference capacitor electrodes and the SN ratio of the reference capacitor including the parasitic capacitance relative to the change of the active capacitor increases and varies. Consequently the accuracy of measurement of fluid pressure will go down.

For a capacitor type pressure sensor comprising, on a semiconductor substrate, an active capacitor which varies as the surrounding pressure varies, a reference capacitor which does not vary substantially as the surrounding pressure varies, and a circuit which is electrically connected to said active capacitor and to said reference capacitor, detects a capacity difference between said capacitors or a rate thereof, and works using the potential of the semiconductor substrate, the aforesaid problem can be solved by forming a reference capacitor electrode on the semiconductor substrate through a dielectric.

BRIEF DESCRIPTION OF THE DRAWINGS

FIG. 8 is a block diagram of a pressure detecting circuit of the present invention.

DETAILED DESCRIPTION OF THE PREFERRED EMBODIMENTS

Figure 1:
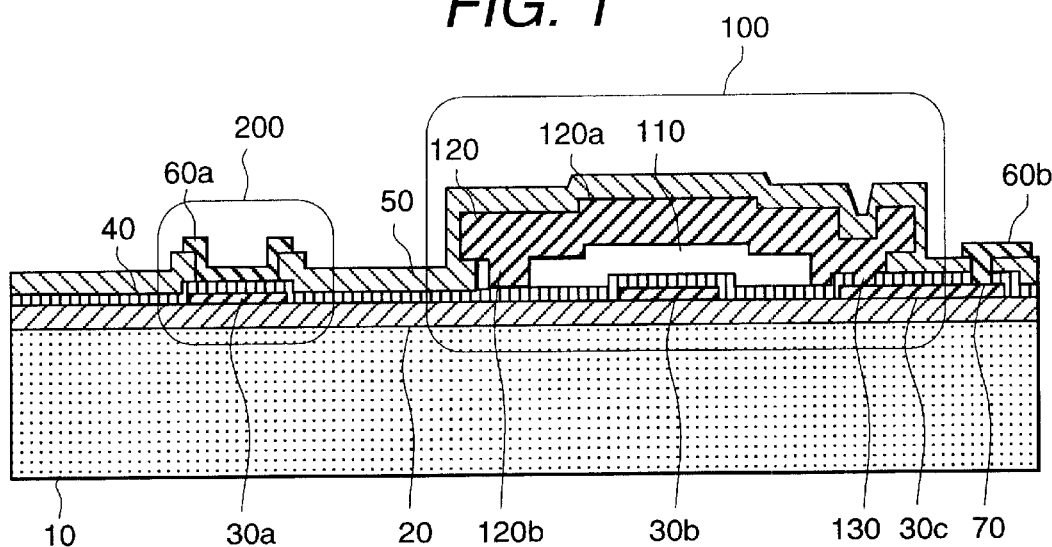
FIG. 1 is a cross-sectional view of a capacitor type pressure sensor which is a first embodiment of the present invention.
Figure 2:
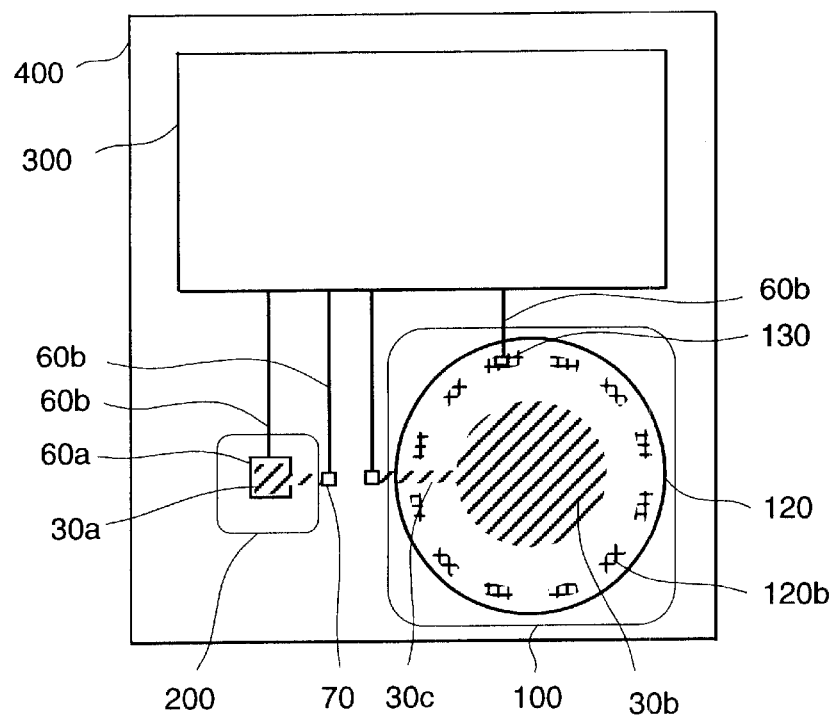
FIG. 2 is a plan view of a capacitor type pressure sensor which is a first embodiment of the present invention.

FIG. 1 shows a cross-sectional view of a capacitor type pressure sensor which is a first embodiment of the present invention. FIG. 2 shows its plan view.

This embodiment shows a pressure detecting IC 400 of a semiconductor capacitor type pressure sensor comprising an active capacitor 100, a reference capacitor 200 and a detecting circuit 300 which are formed on a semiconductor substrate 10 with an oxide dielectric 20 between the substrate and these means.

The semiconductor substrate 10 is a general-purpose single-crystal silicone substrate. For the use of a C-MOS IC which has less integration processes than a bipolar IC, an n- or p-type single-crystal CZ substrate of resistivity of 8 to 12 Ωcm is employed.

The oxide dielectric 20 electrically isolates the active capacitor 100 and the reference capacitor 200 from the semiconductor substrate 10. The oxide dielectric 20 is made of a thermal oxide layer, a CVD (chemical vapor deposition) oxide layer, etc. and the specific inductive capacitance is approximately 3 to 4. A thermal oxide layer (field oxide layer) can be formed together with a C-MOS IC. This can reduce the process steps and provide cheaper pressure sensors.

The active capacitor 100 comprises an active capacitor stationary electrode 30b, a barrier dielectric layer 40, a cavity 110, and a diaphragm structure 120. The cavity 110 is hermetically sealed to keep the almost vacuum status by a sealing dielectric 50. With this, the diaphragm structure 120 moves as the surrounding pressure varies. The diaphragm structure 120 comprises a diaphragm electrode 120a which is opposite to the stationary electrode 30b and a stationary scaffold 120b. The diaphragm electrode 120a can be obtained by making-poly-silicone as a diaphragm structure 120 conductive by an impurity diffusion method. The stationary scaffold 120b can be provided on the semiconductor substrate 10 with a barrier dielectric layer 40 between the substrate 10 and the scaffold 120b by eliminating an isolation layer in advance using a barrier dielectric layer 40 as an etching stop layer when creating a cavity 110 by etching the isolation layer. This configuration enables conversion of a change of the surrounding pressure into a change of capacitance between the active capacitor stationary electrode 30b and the diaphragm electrode 120a. A potential between the active capacitor stationary electrode 30b and the diaphragm electrode 120a can be fed to the detecting circuit 300 as explained below. The potential of the diaphragm electrode 120a is led to a wiring section 60b through a wiring 30c, a contact structure 70, and a diaphragm electrode joint 130 (see FIG. 1). Similarly, the active capacitor stationary electrode 30b is connected to a wiring section 60b through the wiring 30c and the contact structure 70 (see FIG. 2). The diaphragm electrode joint 130 is an electrically-conductive structure made by eliminating part of the barrier dielectric layer 40 on the wiring 30c which is formed on the oxide dielectric 20. The lower electrode 30a, the active capacitor stationary electrode 30b, and the wiring 30c are conductive layers. When these layers are simultaneously processed together with gates of a C-MOS device such as silicide or poly-silicone layer which underwent an impurity diffusion, process steps can be reduced and consequently cheaper pressure sensors can be provided.

The reference capacitor 200 comprises a lower electrode 30a, a barrier dielectric layer 40, and an upper electrode 60a. The reference capacitor 200 is formed on the semiconductor substrate 10 with an oxide dielectric 20 therebetween. This can make the parasitic capacitance between the semiconductor substrate 10 and the lower electrode 30a much smaller than that of conventional examples. Further the parasitic capacitance between the semiconductor substrate 10 and the lower electrode 30a does not have a voltage dependence substantially. Therefore, a high-accuracy and high-stability pressure sensor can be provided.

FIG. 8 shows a schematic block diagram of a pressure sensor in accordance with the present invention. This embodiment mainly comprises a capacitance-voltage conversion section (capacitance detector) of a general switched capacitor type and a zero sensitivity adjuster.

Vcc, SW1 and SW2, CR, CS, CF, and G2 are respectively a supply voltage, selection switches, a reference capacitor 200, an active capacitor 100, a feedback capacitor of a working amplifier G1, and a working amplifier in that order. Let's assume that a parasitic capacitance between the lower electrode 30a and the semiconductor substrate 10 is present at point A. The parasitic capacitance and the wiring resistance causes a primary delay in the switching frequency of the switch SW1. This delay reduces the accuracy of measurement. If the parasitic capacitance has a voltage dependence, the operation becomes more unstable and the accuracy of measurement becomes worse. If the parasitic capacitance is at point B, the S/N ratio of the active capacitor (the quantity of capacitance change and the whole capacitance) becomes greater and the accuracy of measurement becomes worse. Further the parasitic capacitance has a voltage dependence, the output VO becomes unstable.

The reference capacitor 200 in FIG. 1 is a parallel-plate capacitor whose capacitance is dependent upon electrode area, electrode-electrode distance and specific inductive capacitance of inter-electrode material. This first embodiment determines the distance between electrodes and the inter-electrode material by the barrier dielectric layer 40. The specific inductive capacitance of the barrier dielectric layer 40 using a CVD nitride layer is approximately 7 to 9. Therefore, the capacitance approximately equal to the active capacitor 100 can be attained by a less electrode area. This makes the pressure sensor more inexpensive.

Figure 3:
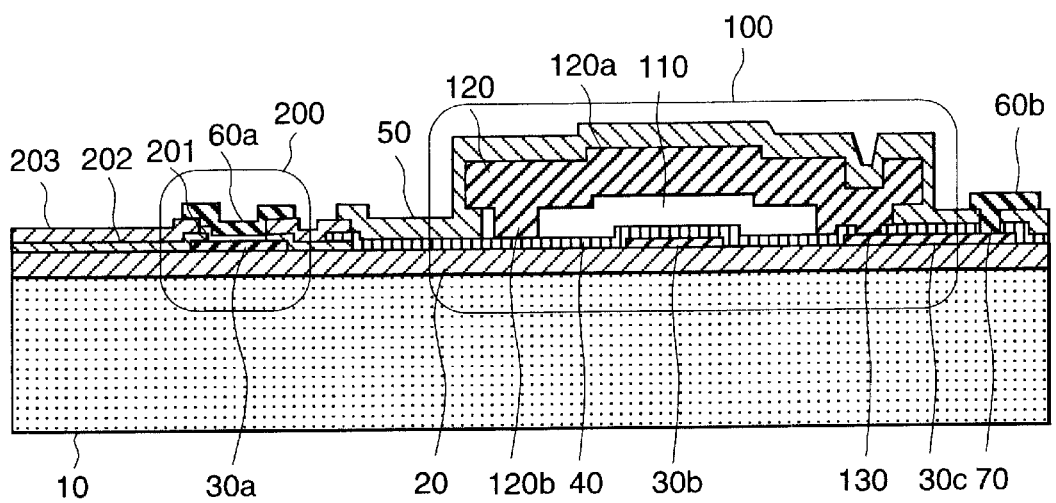
FIG. 3 is a cross-sectional view of a capacitor type pressure sensor which is a second embodiment of the present invention.

FIG. 3 shows a cross-sectional view of a capacitor type pressure sensor which is a second embodiment of the present invention in which the reference capacitor 200 does not contain the barrier dielectric layer 40. The reference capacitor 200 of this embodiment comprises a lower electrode 30a, a reference capacitance dielectric 201, an oxide layer 202, and an upper electrode 60a. This configuration can determine the thickness and material of the reference capacitance dielectric 201 which is an inter-electrode dielectric of the reference capacitor 200 separately from the barrier dielectric layer 40. Therefore, this embodiment can provide inexpensive pressure sensors having less reference capacitor 200 areas.

Figure 4:
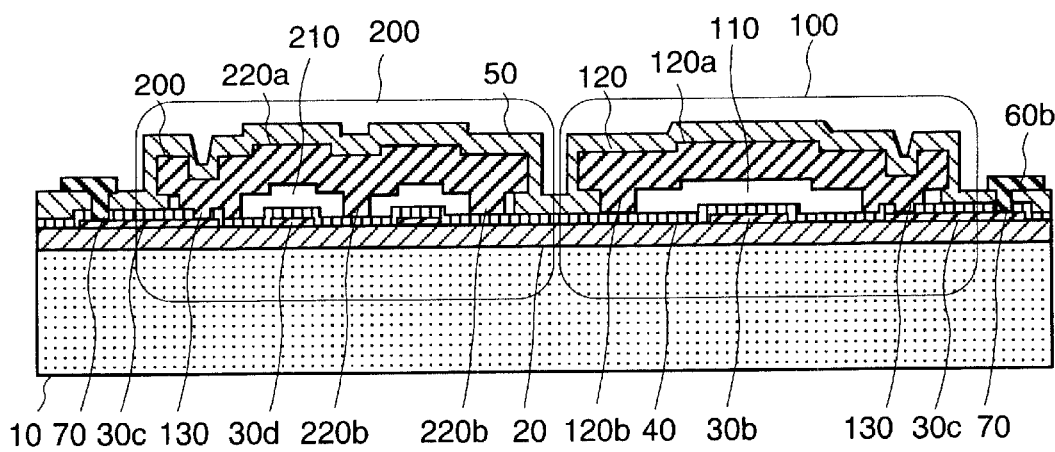
FIG. 4 is a cross-sectional view of a capacitor type pressure sensor which is a third embodiment of the present invention.
Figure 5:
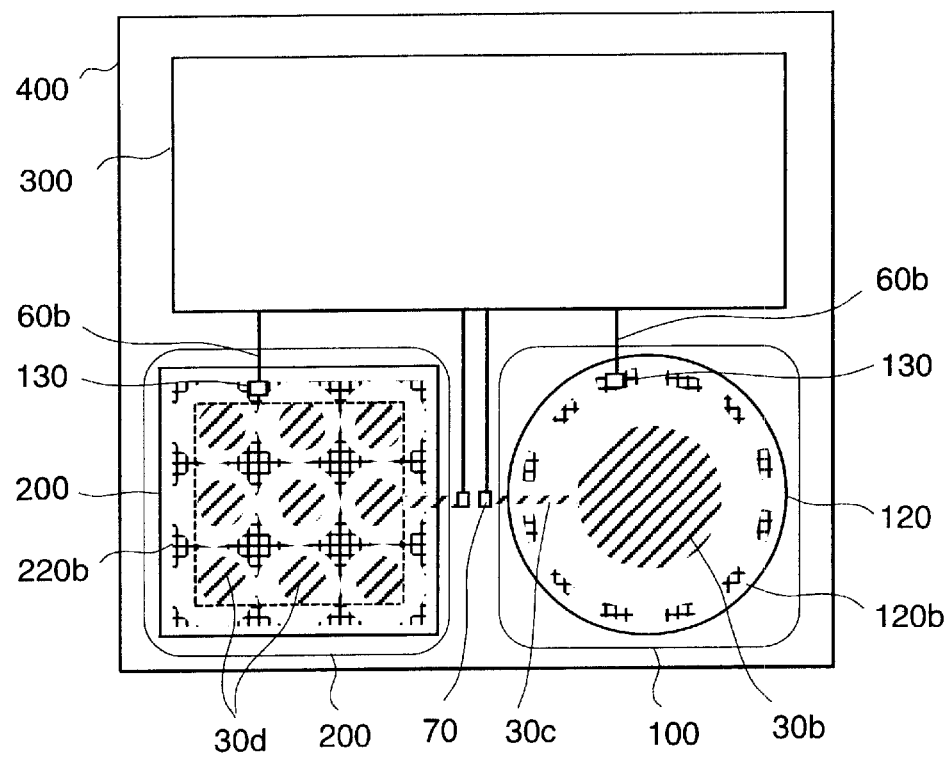
FIG. 5 is a plan view of a capacitor type pressure sensor which is a third embodiment of the present invention.

FIG. 4 shows a cross-sectional view of a capacitor type pressure sensor which is a third embodiment of the present invention. FIG. 5 shows its plan view.

This embodiment produces the reference capacitor 200 in the same method as the active capacitor. The reference capacitor 200 comprises a reference capacitor stationary electrode 30d, a cavity 210, and a diaphragm structure 220 and is formed on the semiconductor substrate 10 with an oxide dielectric 20 therebetween. The diaphragm structure 220 is constructed with a stationary scaffold 220b and a diaphragm electrode 220a that is opposite to the stationary electrode 30d. The parasitic capacitance between the semiconductor substrate 10 and the reference capacitor 200 is small and does not have a voltage dependence substantially. Therefore this embodiment can provide a high accuracy pressure sensor. The scaffolds 220b of the reference capacitor 200 are spaced at shorter distances than the scaffolds 120b of the active capacitor 100 so that the capacitance of the reference capacitor 200 may not vary substantially as the surrounding pressure varies. For example, when the scaffolds 220b spaced at a distance one fourth of the distance of the scaffolds 120b, the ratio of a capacitance change of the reference capacitor 200 to the capacitance change of the active capacitor 100 is about 1/256 because the displacement of the diaphragm structure 220 is proportional to the fourth power of the space of the stationary scaffolds 220b.

This configuration enables simultaneous formation of the reference capacitor stationary electrode 30d and the active capacitor stationary electrode 30b, the cavity 210 and the cavity 110, and the diaphragm structure 220 and the diaphragm structure 120. This can also eliminate uneven production of the active capacitor 100 together with the reference capacitor 200. Further this can eliminate characteristic changes due to external disturbances such as noises of an identical member.

Figure 6:
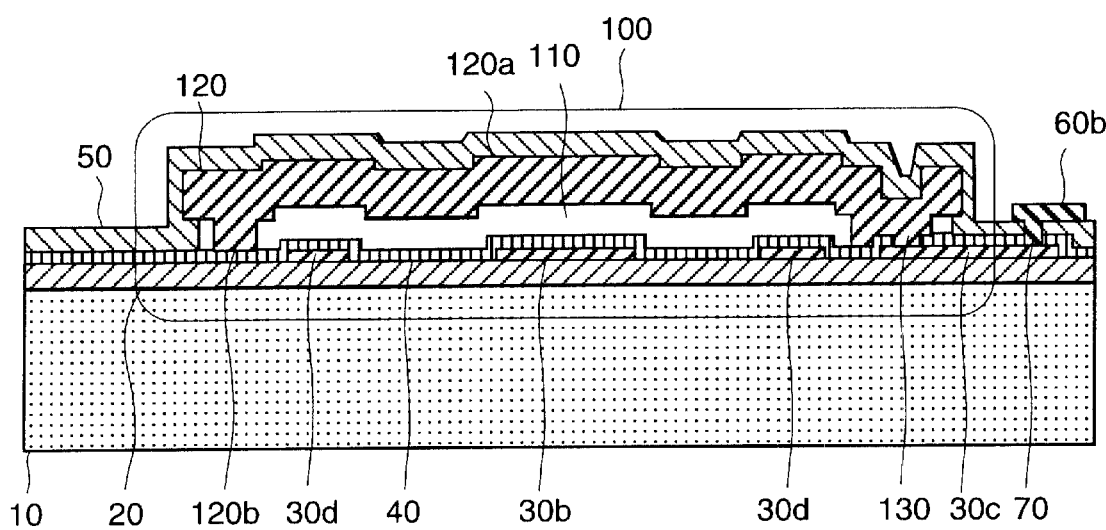
FIG. 6 is a plan view of a capacitor type pressure sensor which is a fourth embodiment of the present invention.
Figure 7:
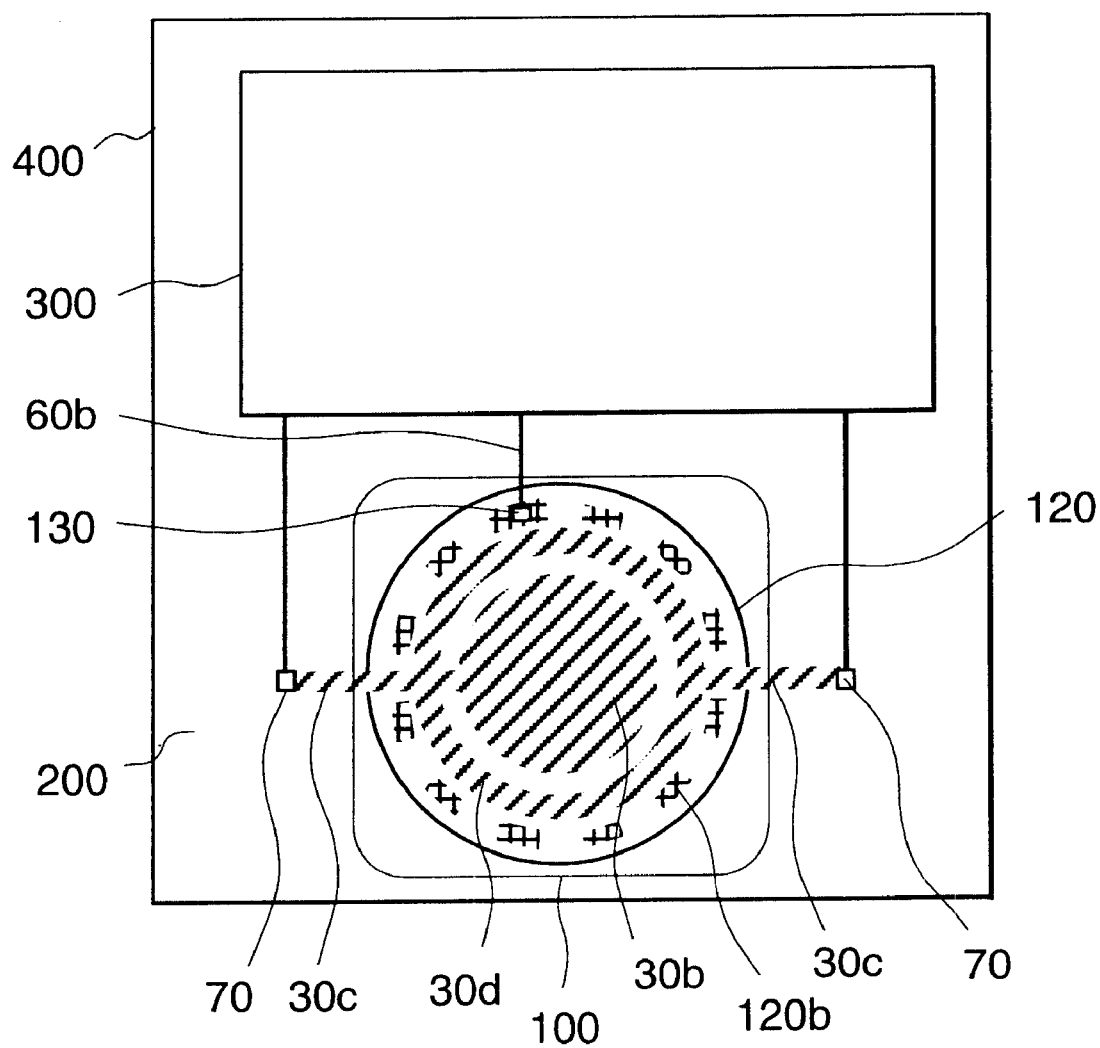
FIG. 7 is a cross-sectional view of a capacitor type pressure sensor which is a fourth embodiment of the present invention.

FIG. 6 shows a cross-sectional view of a capacitor type pressure sensor which is a fourth embodiment of the present invention. FIG. 7 shows its plan view.

This embodiment has the reference capacitor stationary electrode 30d formed in the diaphragm structure 120. The reference capacitor stationary electrode 30d is placed near the scaffold 10b and the active capacitor stationary electrode 30b is placed in the center so that the displacement of the diaphragm structure 120 may be greatest in the center of the structure and smallest in the periphery of the stationary scaffolds 120b. Therefore, the capacitance change of the reference capacitor 200 due to a pressure is not dependent upon the pressure substantially. Although a capacitor type pressure detecting section having such a configuration to minimize areas has been well known, the parasitic capacitance between the semiconductor substrate 10 and the reference capacitor stationary electrode 30d will reduce the accuracy of measurement when the detecting section and the detecting circuit 300 are integrated on the semiconductor substrate 10. Therefore, the present invention has solved the problem by forming the reference capacitor stationary electrode 30d with an oxide dielectric 20 therebetween.

In summary, the present invention can provide a high-accuracy and high-stability capacitor type pressure sensor having a very small parasitic capacitance between the reference capacitor and the semiconductor substrate and a voltage dependence which can be ignored substantially.

Further, the present invention can integrate the circuit section and the pressure detecting section in a single chip and thus provide a small and inexpensive pressure sensor.

INDUSTRIAL AVAILABILITY OF THE INVENTION

The present invention can provide a high-accuracy and high-stability capacitor type pressure sensor having a very small parasitic capacitance between the reference capacitor and the semiconductor substrate and a voltage dependence which can be ignored substantially. Further, the present invention can integrate the circuit section and the pressure detecting section in a single chip and thus provide a small and inexpensive pressure sensor. Furthermore, the present invention can provide pressure sensors which have preferable characteristics and high reliability also for automobiles.

What we claim is:

1. A capacitor type pressure sensor comprising an active capacitor between electrodes whose capacitance varies as the surrounding pressure varies, a reference capacitor between electrodes whose capacitance will not vary substantially as the surrounding pressure varies, and a circuit which is electrically connected to both said active and reference capacitors, detects the difference or ratio thereof, and uses the potential of a semiconductor substrate, wherein said reference capacitor is configured to act as a conductive electrode and is provided on the semiconductor substrate through an intervening dielectric substance.

2. A capacitor type pressure sensor in accordance with claim 1, wherein said active capacitor is formed on said semiconductor substrate with said dielectric therebetween.

3. A capacitor type pressure sensor in accordance with claim 1, wherein said reference capacitor contains a dielectric between electrodes.

4. A capacitor type pressure sensor in accordance with claim 1, wherein said reference capacitor has a cavity between the electrodes and the electrodes and the cavity of said reference capacitor are simultaneously formed with the same material as the active capacitor.

5. A capacitor type pressure sensor in accordance with claim 4, wherein one electrode of said reference capacitor has a diaphragm structure of the active capacitor, said diaphragm structure being secured by scaffolds to the semiconductor substrate, and the other electrode of said reference capacitor is placed near the scaffolds in an area delineated by the scaffolds.

* * * * *